March 1, 1966 P. R. BUNNELLE ETAL 3,237,408
VARIABLE SPEED HYDROKINETIC COUPLING
Filed April 1, 1964 7 Sheets-Sheet 4

INVENTORS
PHILIP R. BUNNELLE
WENDELL S. THOMPSON
BY
ATTORNEY

FIG_13

INVENTORS
PHILIP R. BUNNELLE
WENDELL S. THOMPSON
BY *Hans G. Hoffmeister*
ATTORNEY

United States Patent Office 3,237,408
Patented Mar. 1, 1966

3,237,408
VARIABLE SPEED HYDROKINETIC COUPLING
Philip R. Bunnelle, Santa Clara, and Wendell S. Thompson, Saratoga, Calif., assignors to FMC Corporation, San Jose, Calif., a corporation of Delaware
Filed Apr. 1, 1964, Ser. No. 356,679
6 Claims. (Cl. 60—54)

This invention relates to fluid couplings, and more specifically to what are known as variable fill fluid couplings. In fluid couplings of this type, liquid constantly bleeds from the working chamber of the coupling, and charging liquid is constantly added to the working chamber of the coupling. Either the rate of bleeding of liquid from the working chamber of the coupling, or the rate of filling or charging the coupling can be varied, the result being that the level of fill in the working chamber of the coupling become stabilized at a particular degree of fill, which determines the speed of the runner or driven element of the coupling under a given load.

In the coupling of the present invention, the bleed orifices from the working chamber are of fixed size, and the rate of filling or charging of the working chamber is varied, to determine the level or percent fill of the coupling. This, in turn, determines the degree of slip of the runner relative to the impeller. In the case of the present invention, since the impeller is driven at constant speed, the aforesaid variation in charging rate determines the speed of the runner, and hence the speed of the output shaft of the coupling.

Variable fill couplings of the type to which the present invention relates are particularly useful for driving pumps, such as centrifugal pumps. Such pumps may serve as booster pumps in apartment houses and other buildings, and find applications in municipal water systems and in commercial and industrial processes. They may be employed as an auxiliary booster where available water pressure is not always sufficient to meet the demand.

The variable fill couplings can also be used to provide a constant speed output from the variable speed input, using controls known in the art.

In accordance with the present invention the working chamber of the coupling is charged from a slinger, which is mounted on the impeller, and supplies the charging liquid by dipping into the sump of the coupling housing and flinging the liquid thereby picked up by centrifugal force, so as to cause the liquid to flow upwardly into a reservoir tank within the coupling housing. The charging liquid flows by gravity from an orifice in the bottom of the tank, whereupon it is divided between a path leading to the working chamber of the coupling, and a path leading to the sump. This division of the charging stream is effected by a movable charging stream splitter assembly. The position of the splitter relative to the orifice in the tank, determines the portion of charging liquid that enters the working chamber of the coupling, with the balance of the charging liquid being bypassed or returned to the sump. Control means are provided to determine the relative position of the splitter and the orifice in the tank.

The use of a similar splitter in a coupling of a somewhat different type and general organization, is disclosed and claimed in the copending application Serial No. 264,422, entitled Variable Speed Coupling, filed March 11, 1963, and assigned to the assignee of the present invention.

It is an object of the present invention to provide a variable speed coupling of the type described, wherein the hydraulic liquid that reaches the sump of the coupling, either by being bypassed by a charging splitter, or by having been drained from the working chamber of the coupling, is returned to a reservoir tank in the coupling housing which tank is disposed above the impeller and runner assembly, for gravity flow from the reservoir to the charging splitter. The reservoir is supplied with hydraulic liquid by means of a slinger mounted on the coupling impeller or runner.

Another object of the invention is to provide a coupling of the variable fill, fixed bleed type, which dispenses with the need for a separately driven charging pump.

Another object of the present invention is to provide a variable fill coupling of the type described, wherein all of the control and working parts are mounted within the coupling housing, there being a single adjustment knob projecting externally of the housing.

A further object of the present invention is to provide a lightweight, simple charging chute and shroud construction.

Another object of the present invention is to provide a variable fill coupling of the type described, which can include a large number of relatively lightweight, low cost sheet metal parts, and which coupling is more economical in construction than equivalent variable speed devices of equal power and performance.

The manner in which these and other objects of the present invention may be attained will be apparent to those skilled in the art from the following detailed description of the invention.

Figure 1:
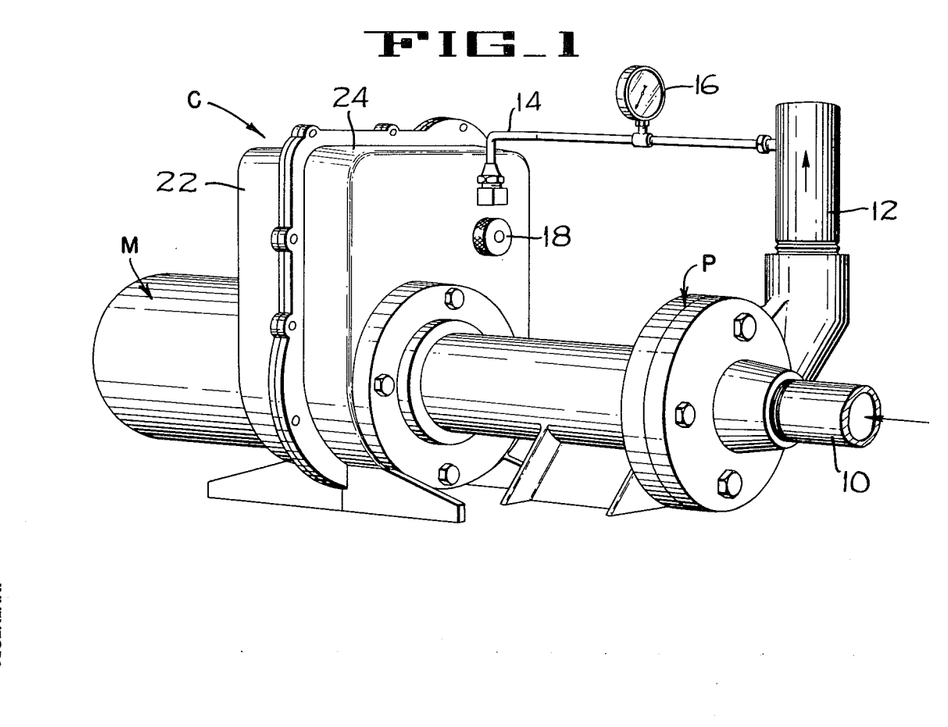
FIGURE 1 is a perspective of a coupling embodying the invention, showing the drive motor and a centrifugal pump connected to the coupling.

Referring to FIGURE 1, an assembly embodying the present invention includes variable fill coupling C which mounts a constant speed drive motor M, and a centrifugal discharge pump P. A liquid inlet line 10 connects to the pump housing, and the impeller of the pump (not shown) discharges liquid under a selected pressure to a liquid delivery or outlet line 12. A pressure control line 14 connects between the delivery line 12 and the control system for the coupling, to be described in detail presently. A pressure gauge 16 is mounted in the control line 14. In order to select the desired delivery pressure, an adjusting knob 18 projects externally of the coupling housing, which knob can be set to cause the coupling to provide the desired nominal gauge pressure in the delivery line 12.

Figure 2:
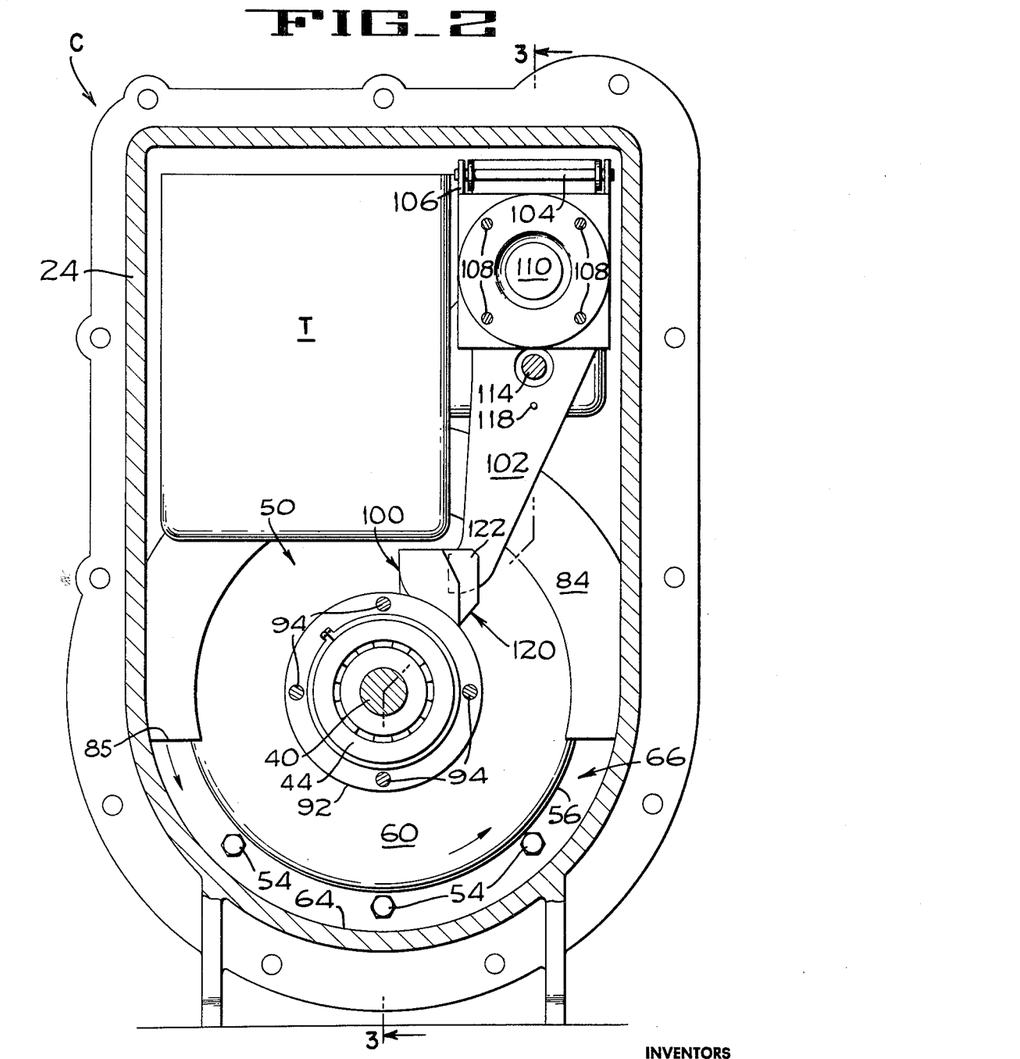
FIGURE 2 is a front elevation of the coupling taken from the pump side, with the housing wall broken away and showing the interior of the coupling.

The general construction of the coupling, with the exception of the control and splitter element details, will now be described in connection with FIGURES 2–4. The coupling C includes a housing section 22, which mounts the drive motor M, and a complementary housing section 24, which mounts the pump P. Within the housing formed by the assemblage of sections 22 and 24, is an impeller 26 having a hub portion 28, that is keyed to the drive motor shaft 30. The impeller 26 is in the usual semi-toroidal form, and includes vanes or blades 32 in the conventional manner. Cooperating with impeller 26 is a runner 34, likewise formed with vanes or blades 35 and having a splined hub 36. The runner hub 36 is splined to a sleeve 38 which is in turn splined to the shaft 40 of the pump P. A pilot bearing 42 is mounted between the sleeve 38 and the hub portion 28 of the impeller. A bearing 44 is mounted between the pump shaft 40 and the housing section 24.

In order to complete the active or working chamber for the impeller and runner assembly, a shroud 50 is bolted to a flange 52 formed on the impeller 26, by means of bolts 54. The shroud 50 is formed with an annular peripheral wall portion 56, which includes one or more bleed or discharge orifices 58, whereby liquid in the working chamber of the coupling is continuously discharged during operation of the apparatus. A radial wall portion 60 extends inwardly from the annular wall portion 56 of the shroud 50, and terminates in a charging mouth 62, for receiving charging liquid for introduction into the active or working chamber of the coupling, in a manner to be described.

Figure 10:
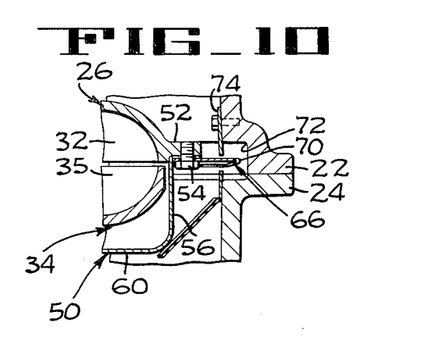
FIGURE 10 is a fragmentary section taken on lines 10—10 of FIGURE 4, showing the slinger and return channel.
Figures 11, 12:
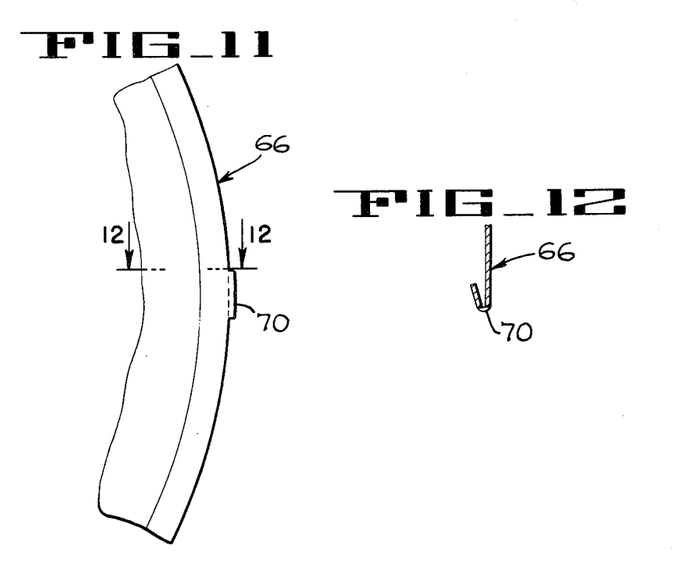
FIGURE 11 is an enlarged fragmentary elevation of a portion of the slinger.
FIGURE 12 is a fragmentary section of the slinger taken on lines 12—12 of FIG. 11.

The bottom of the housing of the coupling forms a sump 64 for containing a body of the hydraulic liquid, such as oil indicated generally at L. In order to transfer liquid from the sump 64 into a reservoir or tank T mounted in an upper portion of the housing, a slinger 66 is mounted on the impeller flange 52 previously described, by means of the bolts 54 which mount the shroud 50. The slinger is basically a thin disc having a recurved lip (FIGS. 11 and 12) connected to the body of the slinger by means of connecting webs 70. With this construction, when the impeller is being rotated by the drive motor M, the slinger 66 picks up oil from a channel 72 formed in the housing section 22, which is filled at its lower portion by liquid L in the sump 64. The channel 72 extends up along one side of the housing section 22 to form the return channel (FIGS. 3, 4 and 10) for the liquid picked up by the slinger 66. The return channel 72 is covered along most of its length by a cover plate 74, which is bolted to the housing section 22 and is notched to receive the slinger 66 where it is coextensive with the slinger.

Figure 3:
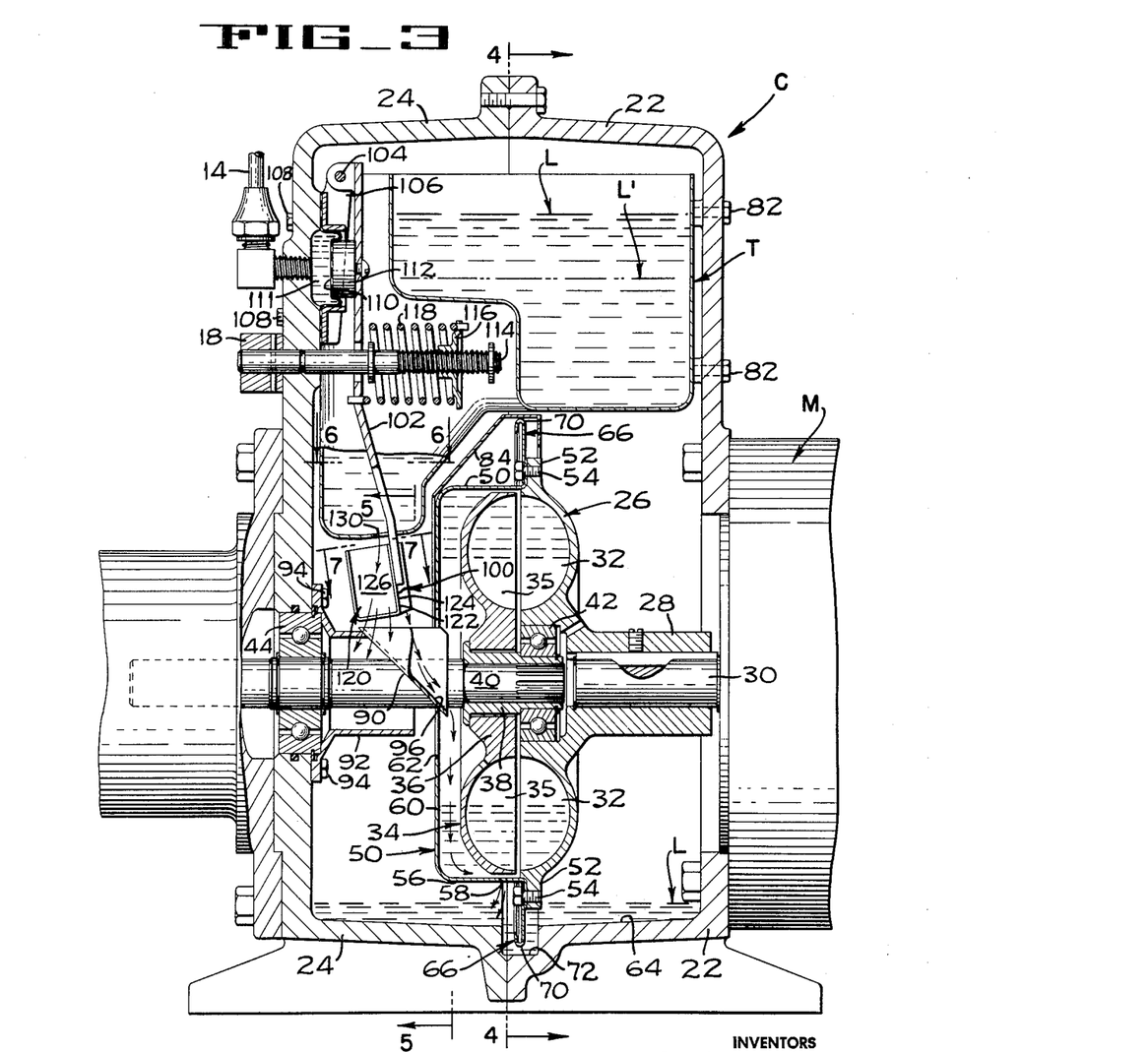
FIGURE 3 is a section of the coupling taken on lines 3—3 of FIG. 2.
Figure 4:
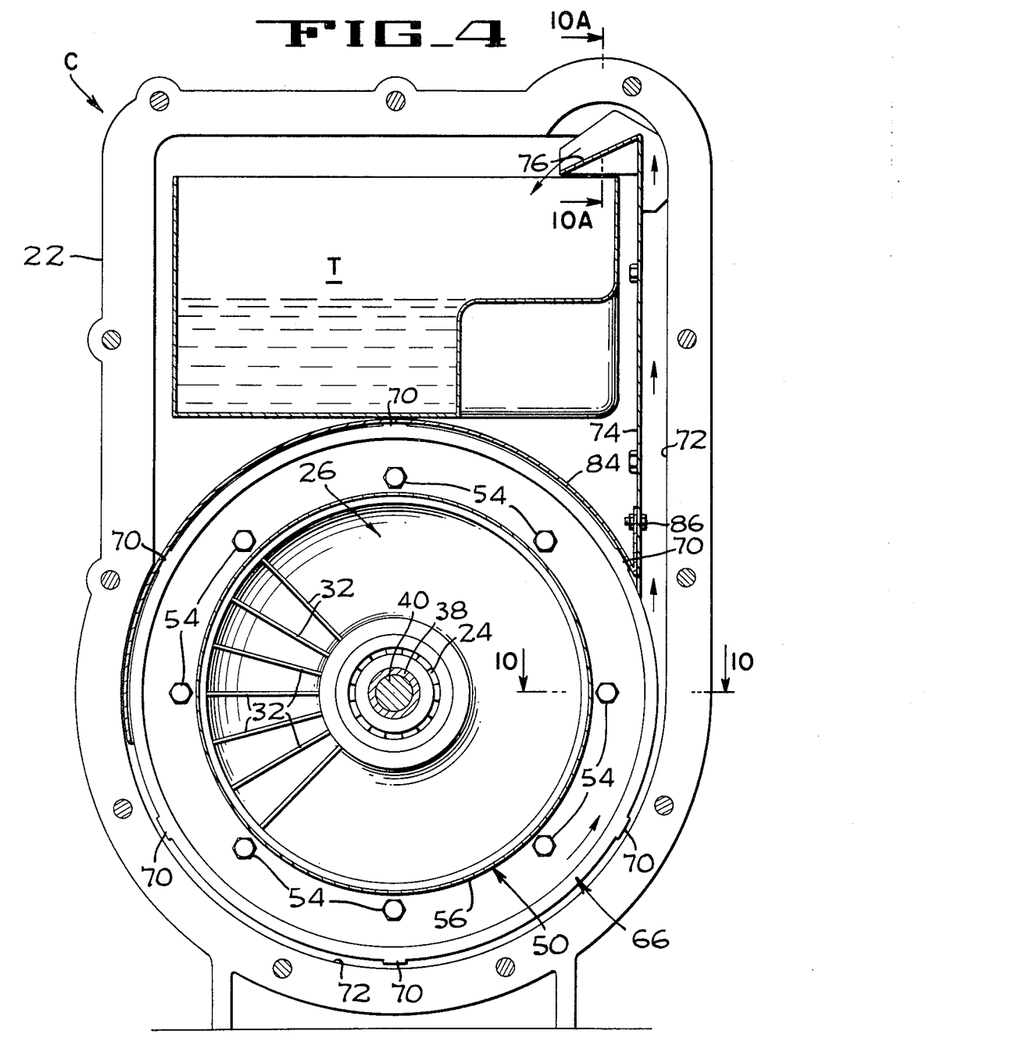
FIGURE 4 is a section of the coupling taken on lines 4—4 of FIG. 3.
Figure 10A:
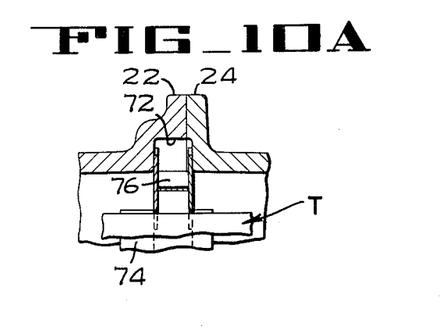
FIGURE 10A is a fragmentary section taken on lines 10A—10A of FIG. 4.

As best seen in FIGURE 4, the upper end of the return channel 72 in the cover 74 communicates with a return spout 76, which forms a continuation of the return channel and its cover, and directs fluid impelled upwardly through the return channel back into the reservoir or tank T. These parts are best seen in FIGURES 4 and 10A. The tank T has an open top, at least at the spout 76, and is bolted to the housing section 22 by means of bolts 82, as seen in FIG. 3. In order to redirect fluid that is picked up by the slinger from the sump, and is not discharged to the return channel 72, back into the sump 64, a splash guard 84 (FIGS. 3 and 4) is mounted by means of bolts 86 (FIG. 4) on the return channel cover plate 74, out of the end 85 of the shroud (FIG. 2).

Figure 5:
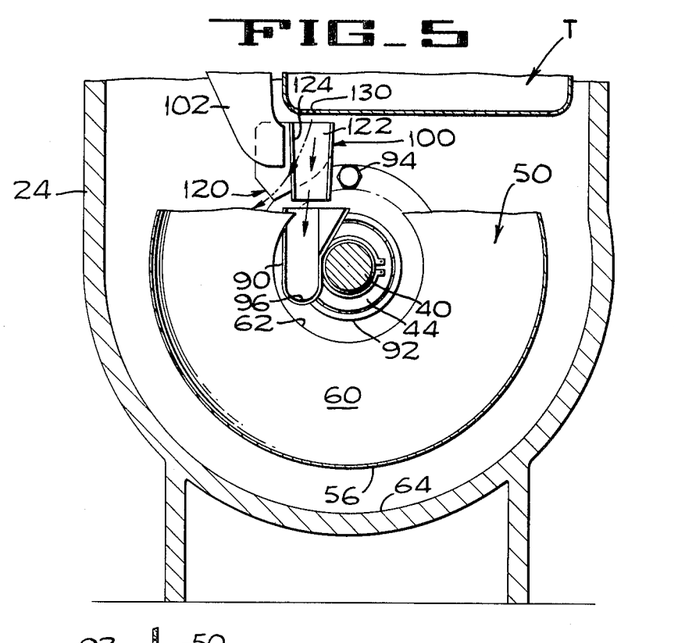
FIGURE 5 is a fragmentary section of the coupling taken on lines 5—5 of FIG. 3 showing the splitter and filling chute.

The charging control and splitter units will now be described in detail. A charging chute 90, bent up of sheet metal, is welded to a charging chute mounting sleeve 92, which is in the form of a flanged tube bolted to the housing section 24. The sleeve is secured to the housing section 24 by means of bolts 94. As seen in FIG. 5, the charging chute 90 is disposed to one shaft side of the pump shaft 40, and this provides a lightweight, simple and economical construction. The mouth or delivery end of the charging chute 90, indicated at 96, lies axially within the plane of the radial wall portion 60 of the shroud 50, that is, the charging chute projects partially into the charging mouth 62 of the shroud.

Hydraulic liquid L is transferred from the tank T to the charging chute 90 or back to the sump 64, or to both, by means of a splitter assembly indicated generally at 100. The splitter assembly includes an arm 102 (FIGS. 2 and 3), pivotally mounted on a pivot 104, which is carried by an arm mounting bracket 106, secured to the housing section 24 by mounting screws 108. In order to provide for delivery pressure type control of the coupling, a flexible diaphragm 110 (FIG. 3) is clamped between the mounting bracket 106 and the housing section 24. The diaphragm cooperates with the housing section to provide a control chamber 111, which receives control (pumped) liquid under pressure from the control line 14 previously described, and illustrated completely in FIG. 1 of the drawings. A diaphragm engaging button 112 is screwed to the splitter arm 102 so that the position of the arm can be controlled by the pressure of the pumped liquid in the control chamber 111, previously described.

The pressure control adjustment, which is most completely shown in FIG. 3, includes a manually adjustable control screw 114, the outer end of which mounts the control knob 18, previously mentioned. A flanged control nut 116 is threaded on the end of the control screw 114 and backs up one end of a pressure regulating or control spring 118, the other end of which is backed up by the arm 102 forming part of the splitter assembly.

The active element of the spliter assembly 100, is a splitter spout 120, mounted on the lower end of the splitter arm 102. The spout 120 includes a generally vertical splitter wall 122, from one side of which projects a charging spout 124, and from the other side of which projects a bypass or return spout 126. The splitter wall 122 lies beneath a discharge or metering orifice 130 formed in the bottom wall of the tank T. In normal operation, the splitter wall 122 divides liquid L draining through the orifice 130 in the tank T, between the charging spout 124, which directs such liquid into the charging chute 90, and the bypass or return spout 126, which causes the liquid to flow to one side of the charging chute 90 (FIG. 3) and thereby fall into the sump 64.

In describing the operation of the coupling, it will first be assumed that the adjusting knob 18 is set to compress the control spring 118 for operation at some intermediate pressure, within the operating pressure range of the coupling. When the driving motor M is started up under these conditions, the impeller 26 immediately begins rotating, and the slinger 66 immediately begins to pick up hydraulic liquid from the sump. At the beginning of operation, all of the hydraulic liquid will be in the sump, and the working chamber of the impeller and runner may be empty. However, immediately the impeller 26 begins to rotate, a slinger 66 picks up the liquid from the sump as described, and slings it into the return channel 72, whereupon the liquid is given a velocity and momentum sufficient to cause it to flow upwardly, down the return spout 76 (FIG. 4), and into the reservoir tank T. Within a short time, the sump level will be lowered, as illustrated in FIG. 3, and most of the hydraulic liquid L will be either in the tank T, or in the working chamber formed by the impeller 26 and runner 34 as well as in the shroud 50. As soon as the tank T receives a charge of liquid from the slinger 66, the same liquid begins to flow by gravity down out through the metering orifice 130 in the bottom of the tank. However, the liquid level within the tank will begin to rise, and depending upon the pressure control adjustment by means of the knob 18 will, when steady state conditions are obtained, the liquid level in the tank will lie somewhere between certain upper and lower levels. For example, the level indicated at L in FIGURE 3, illustrates schematically the level that exists under minimum load. Under these conditions, the working chamber within the hydraulic coupling contains a minimum volume of liquid, and the liquid level L of the tank T is correspondingly at its maximum operating height. On the other hand, when a maximum load is imposed upon the coupling, so that the working chamber of the coupling is substantially full to produce minimum slip between the impeller and the rotor, the liquid level in the tank will drop to a height indicated schematically at L', FIG. 3.

Figures 6, 7, 8, 9:
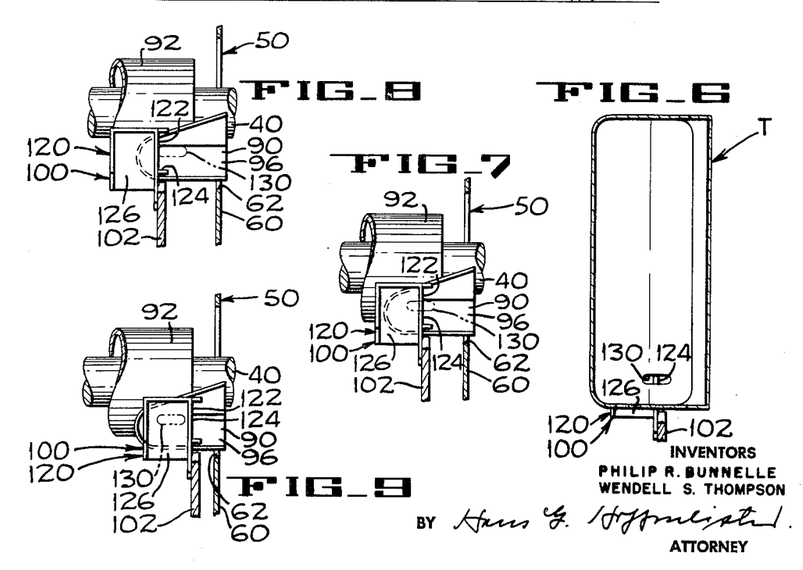
FIGURE 6 is a fragmentary section taken on lines 6—6 of FIG. 3.
FIGURE 7 is a fragmentary section taken on lines 7—7 of FIG. 3, showing the splitter and charging chute, with the splitter in an intermediate charging position.
FIGURE 8 is a section like FIG. 7 showing the splitter in its full charge position.
FIGURE 9 is a section like FIGURE 7 showing the splitter in its full by-pass position.

Referring to the operation of the splitter 100 and its control mechanism, assume as mentioned that the pressure control knob 18 is adjusted to give some intermediate pressure within the operating pressure range of the coupling. Before the coupling is started, the splitter wall 122 will be to the left, as viewed in FIGS. 3 and 8, under the force of the control spring 118, there being no pressure in the control chamber 111. As the coupling is started up, the working chamber thereof begins to fill, and the pressure of the liquid being pumped, and transmitted to the control chamber 111 behind the diaphragm 110 increases. This causes the splitter arm 102 to move to the right, as viewed in FIG. 3, moving the splitter wall 122 from its original no-load position illustrated diagrammatically in FIG. 8 to some intermediate position, such as that illustrated in FIG. 7. The disposition of the splitter that is shown in FIG. 8 is the full, or maximum charging position, and all of the liquid that is transferred by the slinger 66 from the sump 64 into the tank T, and which flows by gravity through the metering orifice 130, down to the splitter spout 120, is directed by the splitter wall 122 into the charging chute 90, and hence into the working chamber of the coupling. The slip between the impeller and the runner gradually decreases, and the runner speed builds up, thereby causing the pump P to pump an increasingly larger volume of liquid, and at a higher pressure, to the delivery line 12. The pressure in the control chamber 111 increases correspondingly, and moves the splitter 100 to the right, until some intermediate position, such as that shown in FIG. 7 is attained. This position will be one wherein part of the liquid issuing from the orifice 130 in the tank T is divided by the splitter wall 122, so as to flow out of the charging spout 124 and into the charging chute 90, thereby reaching the working chamber of the coupling. The balance of the liquid leaving tank orifice 130 passes to the left of the splitter wall 122, as it is viewed in FIGS. 3 and 7, and flows into the bypass or return spout 126. Such liquid then flows along the outside of the charging chute 90, as shown in FIG. 2, and hence falls into the sump 64.

If the pressure within the delivery line 12 increases beyond the set pressure, the splitter 100 is moved still further to the right, which reduces the proportion of charging to bypass liquid, and increases the slip of the coupling. Conversely, if the demand on the pump is increased, so that the pressure in the delivery line 12 begins to fall below the set value, the pressure in the control chamber 111 drops somewhat. The splitter now moves to the left, and the proportion of changing to bypass liquid is increased, until the nominal pressure is re-established.

FIGURE 9 shows diagrammatically the other extreme position of the splitter spout 120, namely that wherein all of the liquid leaving tank orifice 130 flows into the bypass spout 126. This condition would only be present momentarily during normal operation, because if it continued for any length of time, the working chamber of the hydraulic coupling would soon empty itself through the bleed orifices 58 in the shroud 50. However, where the control is set for a low operating pressure, the splitter wall 122 may hover during operation about a position wherein it is displaced to the left somewhat from the extreme position illustrated in FIG. 9. In any event with a given speed motor, and a given capacity of the centrifugal pump, once the pressure control knob 18 is set to provide the desired delivery pressure through the delivery line 12, the splitter wall 122 will assume some nominal or control position relative to the tank orifice 130, and will hover about that position during operation. However, it has been found that the control for the coupling of the present invention does not hunt in service, and the pressure remains substantially constant. However, as in all units of this type, the static discharge pressure-versus-rate of discharge curves droop slightly, as the rate of discharge increases within the limits or capabilities of the coupling. Nevertheless, this droop is relatively slight, and causes no difficulty in maintaining a nominal pressure within the system, without heating or overheating of the apparatus. It has also been found that the slinger 66 transfers liquid from the sump 64 to the tank T efficiently, and requires relatively small power consumption compared to that delivered by the unit.

Figure 13:
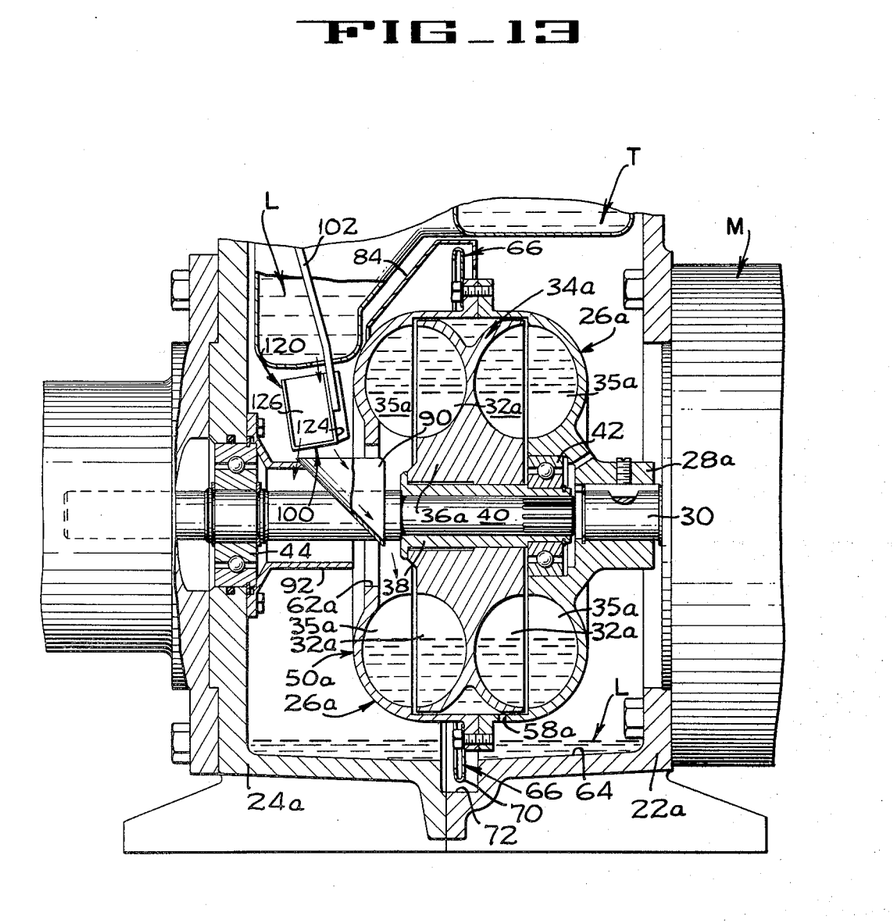
FIGURE 13 is a section like that of FIG. 3, showing a modified form of coupling embodying the invention, but having a double impeller and a double runner.

FIGURE 13 shows a modified form of the invention which has the same mode of operation as that just described, but which incorporates a double runner and a double impeller construction. The splitter and the control therefore are like that previously described, and hence need not be described in detail. The only major difference between the double runner construction of FIG. 13, and the single runner construction just described in detail, is that no separate shroud 50 is required, because the function of the shroud is now assumed by the outer wall 50a of the double runner 26a. This outer wall terminates in a charging mouth 62a, which bears the same relation to the charging chute 90, as does the charging mouth 62 in the form of the invention previously described. The slinger 66, the return channel 72 and the splash guard 84 are as before. Various other parts of the coupling of FIG. 13, which correspond to parts in the single runner unit previously described, are given the same reference numbers with the subscript "a" added thereto, and the description thereof will not be repeated. It will be noted that in the double rotor form of the invention shown in FIG. 13, as well as in the single runner form previously described, the construction of the charging chute and its mounting makes possible the delivery of charging liquid to either the active chamber of the coupling, or to the sump, or to both, and it is extremely simple, lightweight and economical in construction. The only difference between the mode of operation of the double unit device shown in FIG. 13, over that previously described, is that the double unit of FIG. 13 will handle more horsepower per given diameter of coupling, than will the single unit. The control characteristics of the two units are virtually identical.

Having completed the detailed description of the invention so that those skilled in the art may practice the same we claim:

1. A hydraulic coupling comprising a stationary liquid housing including a sump, impeller and runner coupling elements, shafts rotatably mounting said elements in said housing, said coupling elements cooperating to form an active liquid chamber, bleed port means for centrifugally discharging liquid from said active liquid chamber into said sump, means on one of said coupling elements and within said housing forming a charging mouth surrounding one of said shafts, a liquid reservoir mounted on said housing above said coupling elements, said reservoir having an upper, liquid receiving opening, and a lower gravity flow discharge opening disposed above said charging mouth, flow control means between said reservoir discharge opening and said charging mouth for dividing the flow of charging liquid from said reservoir between said charging mouth and said housing sump, said housing having a side wall portion that extends generally upwardly from and tangentially to said coupling elements and a top wall portion that extends from side wall portion over the liquid receiving opening in said reservoir, a generally radial disc-like liquid slinger mounted on one of said coupling elements and dipping into liquid in said sump, liquid passageway means in said housing extending along a path leading from said sump, around substantially a 90° portion of said coupling elements, upwardly along said upwardly extending housing side wall portion, and terminating at the top wall portion of said housing and at the upper, liquid receiving opening of said reservoir, for conducting liquid picked up by and thrown clear of said slinger along said passageway path into said reservoir, and means for adjusting said flow control means for varying the division of liquid received from said reservoir between said charging mouth and said sump.

2. The hydraulic coupling of claim 1, wherein a fixed splash guard is mounted on said housing and below the top wall portion of the housing, said splash guard surrounding an upper portion of the coupling elements and said slinger for returning to said sump liquid that is carried by an upper portion of said slinger around and past the portion of said path formed in said upwardly extending housing side wall portion.

3. A hydraulic coupling comprising a stationary liquid housing including a sump, impeller and runner coupling elements, shafts rotatably mounting said elements in said housing, said coupling elements cooperating to form an active liquid chamber, bleed port means for centrifugally discharging liquid from said active liquid chamber into said sump, means on one of said coupling elements and within said housing forming charging mouth surrounding one of said shafts, an upwardly opening charging chute fixedly mounted in said housing for directing liquid into said charging mouth, a liquid reservoir mounted on said housing above said coupling elements, said reservoir having an upper, liquid receiving opening, and a lower, gravity flow discharge opening disposed above said charging chute, a liquid splitter movably mounted between said reservoir discharge opening and said charging chute for dividing the flow of charging liquid from said reservoir between said charging mouth and said housing sump, said housing having a side wall portion that extends generally upwardly from and tangentially to said coupling elements and a top wall portion that extends from said side wall portion over the liquid receiving opening in said reservoir, a generally radial disc-like liquid slinger mounted on one of said coupling elements and dipping into liquid in said sump, liquid passageway means in said housing extending along a path leading from said sump, around substantially a 90° portion of said coupling elements, upwardly along said upwardly extending housing side wall portion, and terminating at the top wall portion of said housing and at the upper liquid receiving opening of said reservoir, for conducting liquid picked up by and thrown clear of said slinger along said passageway path and into said reservoir, and means for adjusting the position of said liquid splitter relative to said reservoir and said charging chute for varying the division of liquid flowing from said reservoir between said charging mouth and said sump.

4. The hydraulic coupling of claim 3, wherein said liquid splitter comprises a spout, an arm pivotally mounted inside of said housing for supporting said spout, and wherein a control chamber is formed within said housing, said chamber being bounded on one side by a flexible diaphragm connected to said arm, means for introducing fluid under pressure into said chamber to move said arm in one direction, and a spring supported by said housing for opposing motion of said arm by the diaphragm.

5. A hydraulic coupling comprising a liquid housing having a sump, cooperating impeller and runner coupling elements, shafts rotatably mounting said coupling elements in said housing, bleed port means for centrifugally discharging liquid from said active liquid chamber into said sump, a shroud having an annular peripheral portion mounted on the periphery of said impeller element and a wall extending radially inwardly from said peripheral portion and terminating in a charging mouth surrounding said runner shaft, said shroud cooperating with the runner element for forming an active liquid chamber within said runner and impeller elements, a gravity feed liquid reservoir mounted on said housing above said coupling elements, flow control means beneath said reservoir for delivering charging liquid flowing by gravity from said reservoir into said charging mouth, a generally radial disc-like liquid slinger mounted on said impeller element, said slinger projecting radially past said shroud and dipping into liquid in said sump, said slinger being disposed beneath a portion of said reservoir, liquid passageway means in said housing for conducting liquid thrown clear of said slinger into an upper portion of said reservoir, and means for adjusting said flow control means for varying the delivery of charging liquid to said charging mouth.

6. The hydraulic coupling of claim 5, wherein said bleed port means is disposed in the annular peripheral portion of said shroud, closely adjacent to the confronting faces of said runner and impeller elements.

References Cited by the Examiner

UNITED STATES PATENTS

| | | | |
|---|---|---|---|
| 1,082,287 | 12/1913 | Schaffer et al. | 137—611 X |
| 1,975,505 | 10/1934 | Fottinger | 60—54 |
| 2,062,281 | 12/1936 | Alison | 60—54 |
| 2,372,326 | 3/1945 | Hewitt | 60—54 X |
| 2,508,762 | 5/1950 | Lapple | 137—262 X |

References Cited by the Applicant

UNITED STATES PATENTS 2,785,533  3/1957  Thompson.

JULIUS E. WEST, *Primary Examiner.*